US007926789B2

(12) United States Patent
Kohlenberg et al.

(10) Patent No.: US 7,926,789 B2
(45) Date of Patent: Apr. 19, 2011

(54) LIFTING GEAR

(75) Inventors: Thomas Kohlenberg, Paderborn (DE); Stefan Noll, Burscheid (DE); Jurgen Backsmann, Hagen (DE); Christoph Passmann, Dortmund (DE); Gereon Imbusch, Mettmann (DE)

(73) Assignee: Demag Cranes & Components GmbH, Wetter (DE)

( * ) Notice: Subject to any disclaimer, the term of this patent is extended or adjusted under 35 U.S.C. 154(b) by 0 days.

(21) Appl. No.: 12/532,694

(22) PCT Filed: Mar. 18, 2008

(86) PCT No.: PCT/EP2008/053193
§ 371 (c)(1),
(2), (4) Date: Sep. 23, 2009

(87) PCT Pub. No.: WO2008/116783
PCT Pub. Date: Oct. 2, 2008

(65) Prior Publication Data
US 2010/0102287 A1    Apr. 29, 2010

(30) Foreign Application Priority Data
Mar. 27, 2007  (DE) .................. 10 2007 014 505

(51) Int. Cl.
*B66D 1/00* (2006.01)
(52) U.S. Cl. ......... 254/329; 254/278; 403/348; 403/362
(58) Field of Classification Search ............. 254/278, 254/329; 403/348, 328, 325, 362, 379.3
See application file for complete search history.

(56) References Cited

U.S. PATENT DOCUMENTS

| 3,386,549 | A |   | 6/1968  | Clarke |
| 3,744,760 | A | * | 7/1973  | Uher .................... 254/351 |
| 5,474,499 | A | * | 12/1995 | Olson .................... 464/83 |
| 5,855,451 | A |   | 1/1999  | Milton et al. |
| 5,957,615 | A |   | 9/1999  | Orain |

(Continued)

OTHER PUBLICATIONS

International Search Report and Written Opinion of the International Searching Authority from corresponding Patent Cooperation Treaty (PCT) Application No. PCT/EP2008/053193, mailed Jul. 10, 2008.

(Continued)

*Primary Examiner* — Emmanuel M Marcelo
(74) *Attorney, Agent, or Firm* — Van Dyke, Gardner, Linn & Burkhart, LLP

(57) ABSTRACT

The invention relates to lifting gear having a drive unit (2), a drive shaft (3), which has a drive flange (4) fixable thereon and can be driven by the drive unit (2), and a cable drum (5) that can be connected to the drive flange by means of a coupling, said coupling comprising at least one coupling element (10) engaging in a recess (11) in the drive flange (4) and in a hole (12) in the cable drum (5) to transmit torque. In order to equip a lifting gear having a drive unit comprising a motor and a gearbox with a coupling, which ensures simple assembly with a simple and space-saving design, according to the invention the coupling element (10) is movable and fixable radially from an assembly position into an operating position, in which the coupling element (10) connects the drive flange (4) to the cable drum (5) in a driveable manner.

15 Claims, 3 Drawing Sheets

U.S. PATENT DOCUMENTS

| | | | |
|---|---|---|---|
| 6,497,400 B2 | 12/2002 | Buhlmayer et al. | |
| 6,988,715 B2 * | 1/2006 | Winter et al. | 254/278 |
| 7,603,059 B2 * | 10/2009 | Marumoto | 399/167 |
| 2004/0238805 A1 * | 12/2004 | Winter et al. | 254/278 |

OTHER PUBLICATIONS

English translation of the International Preliminary Report on Patentability for International Application No. PCT/EP2008/053193.

* cited by examiner

LIFTING GEAR

CROSS REFERENCE TO RELATED APPLICATIONS

This application claims the priority benefits of International Application No. PCT/EP2008/053193, filed on Mar. 18, 2008, and also of German Patent No. 10 2007 014 505.7, filed Mar. 27, 2007, which are hereby incorporated herein by reference in their entireties.

BACKGROUND OF THE INVENTION

The invention relates to a lifting gear having a drive unit, a drive shaft which can be driven by the drive unit and has a drive flange which can be fixed thereon, and a cable drum which can be connected to the drive flange via a coupling.

Lifting gears which are formed as cable pulls comprise a substantially cylindrical cable drum which is mounted in a rotatable manner in a frame. The cable drum is driven with the aid of a transmission motor, wherein the output shaft of the transmission is coupled in a rotationally fixed manner to the cable drum. In order to compensate for production tolerances, alignment errors and deformations of the cable drum generally equipped with a so-called "3-point bearing", which can lead to warping in the drive, it is known in practice to dispose a coupling between the output shaft and the cable drum, which coupling can accommodate these alignment errors.

DE 298 16 675 U1 discloses a coupling for lifting units to transmit the moment of a driven transmission shaft to a cable drum, having a coupling hub which is disposed on one end of the transmission shaft, and a coupling housing which is closed by inner and outer covers and is disposed on the coupling hub. Disposed in the coupling housing and the coupling hub are cylindrical and oppositely disposed recesses, in which barrel rollers for the transmission of force from the coupling housing to the coupling hub are disposed in a positive-locking manner.

SUMMARY OF THE INVENTION

The present invention equips a lifting gear having a drive unit, which consists of a motor and a transmission, with a coupling which ensures simple assembly in a simple and space-saving construction.

In accordance with an aspect of the invention, in the case of a lifting gear having a drive unit, a drive shaft which can be driven by the drive unit and has a drive flange which can be fixed thereon, and a cable drum which can be connected to the drive flange via a coupling, wherein the coupling includes at least one coupling element which engages in each case into a recess in the drive flange and into a bore in the cable drum in order to transmit torque, a simple and space-saving construction and simple assembly are achieved by virtue of the fact that the coupling element can be moved radially from an assembly position and can be fixed in the operating position, in which the coupling element drivingly connects the drive flange and the cable drum together. This displacement movement of the coupling element permits a particularly simple positive-locking connection of the components which are to be coupled. The coupling is constructed in a particularly simple manner and is cost-effective. During assembly, the coupling element also renders it possible initially to connect the drive flange to the drive shaft and then to push the cable drum over the drive flange and to connect it at this site to the coupling element. The coupling element can be reached particularly easily from the outside and in the radial direction. The entire assembly procedure can thus be performed simply and cost-effectively. It is also readily possible to dismantle the cable drum by releasing the coupling elements.

A compact construction is achieved by virtue of the fact that in the assembly position the coupling element is located completely in the recess of the drive flange.

A particularly secure operating state and captive securing of the coupling element are provided by virtue of the fact that in the operating position the coupling element is held in the recess by the cable drum itself. In this case, in the operating position the shoulder lies against the inner surface of the cable drum. This is particularly important for accident-prevention in the case of lifting gears which are normally disposed above the operators.

In one embodiment the coupling element includes a drum-side, outer driving cam and a flange-side, inner driving cam which adjoins it, the outer driving cam has an outer diameter which is smaller than an outer diameter of the inner driving cam and the coupling element has a shoulder in the region of the transition between the inner driving cam and the outer driving cam.

The coupling element can be moved from the assembly position radially outwards into the operating position in a particularly convenient manner, if the coupling element is formed as a sleeve having a central and radially aligned channel, into which a screw for adjusting the sleeve can be screwed. The adjustment can thus be performed simply from the outside and in the radial direction, from which the coupling is easily accessible. Instead of the screw, it is also possible to use other securing elements.

A simple way of securing the coupling element in the operating position is achieved by virtue of the fact that in the operating position the screw is supported with its tip on a base of the recess of the drive flange, which recess is formed in the manner of a blind hole.

The installation size of the coupling is minimised by virtue of the fact that in the operating position the screw protrudes with its head only slightly, such as less than the cable guide or than the wall thickness of the cable drum from the surface of the cable drum.

A favourable and uniform transmission of torque is achieved by virtue of the fact that several, such as three, coupling elements are disposed along the periphery of the drive flange. Three coupling elements may be provided, whereby the number of components and also the costs can be minimised whilst at the same time achieving a reliable torque transmission.

These and other objects, advantages and features of this invention will become apparent upon review of the following specification in conjunction with the drawings.

DESCRIPTION OF THE PREFERRED EMBODIMENTS

Figure 1:
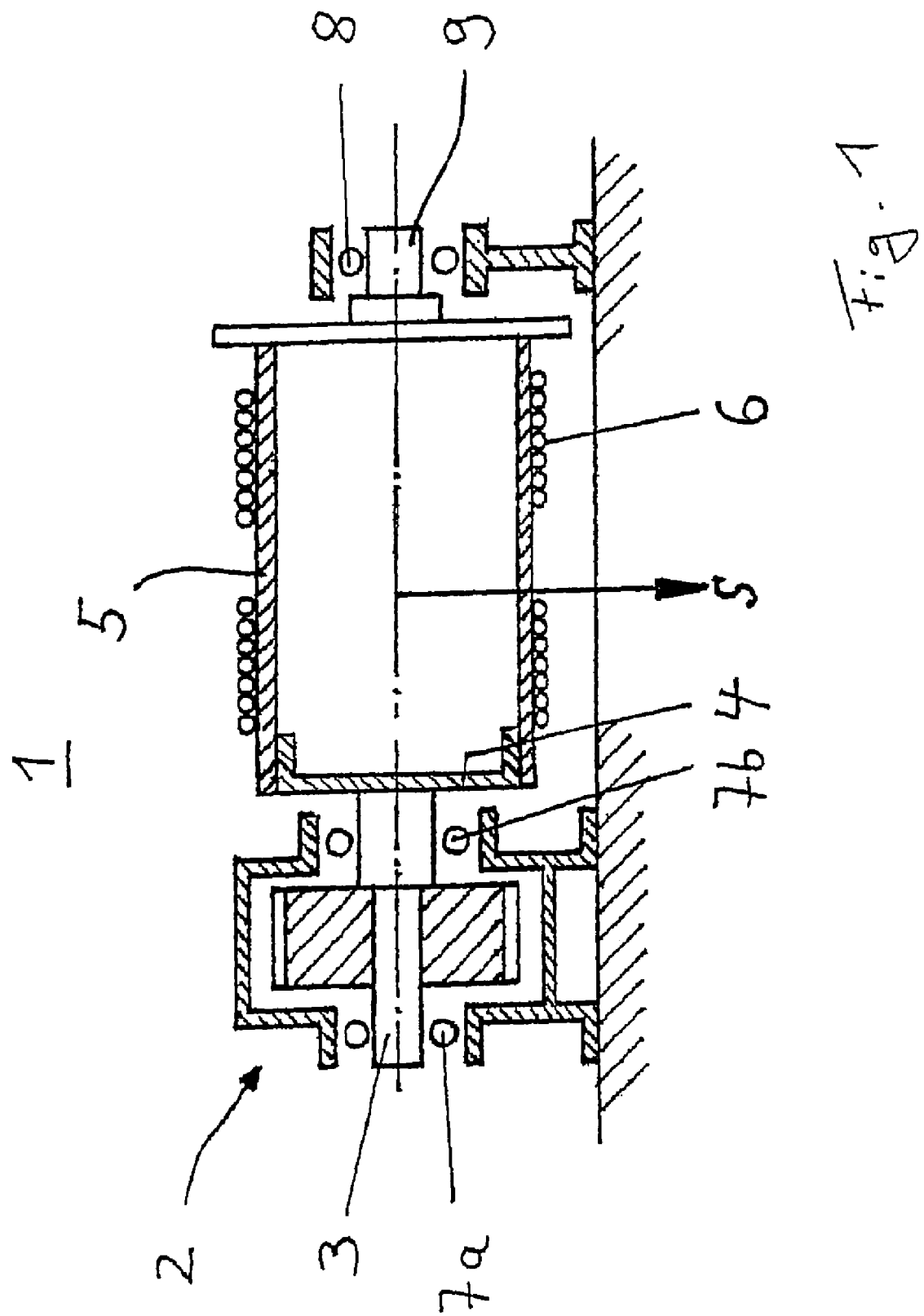
FIG. 1 is a side sectional view of a schematic construction of a lifting gear.

FIG. 1 schematically illustrates the construction of a lifting gear 1 which is formed as a cable pull. The lifting gear 1 comprises essentially a drive unit 2, which consists of a motor and a transmission, a drive shaft 3 which is driven by the drive unit 2 and has a drive flange 4 fixed thereon, and a cable drum 5 which is connected in a rotationally fixed manner to the drive flange 4 and onto which or from which a cable 6, which is only indicated, can be wound or unwound. In this case, the disk-shaped drive flange 4 has an outer diameter which is smaller than the inner diameter of the cable drum 5 in its end region, and is inserted laterally into the cable drum 5 so as to be flush therewith.

As shown in FIG. 1, the cable drum 5 is equipped with a so-called "3-point bearing", in which the cable drum 5 is mounted via two bearings 7a, 7b on the side of the drive shaft 3 and is mounted via a bearing 8 on the side of a drum pin 9 lying opposite the drive shaft 3. It is also possible to support the cable drum 5 directly via a bearing, whose outer ring lies against the inner side of the cable drum 5.

Since, as a result of manufacturing and assembly tolerances and deformations under load, these bearings 7a, 7b and 8 are not always to be disposed in practice precisely aligned in a line, restraint stresses are caused in the mounted components, namely in the drive shaft 3 and/or in the drive flange 4 of the cable drum 5. In order to avoid these undesired stresses which cannot be accurately calculated and which occur in addition to a useful load which acts as a cable pull force S, a coupling is provided which transmits the torque of the drive shaft 3 to the cable drum 5 in such a manner as to compensate for angles and lengths, as illustrated in FIG. 2.

Figure 2:
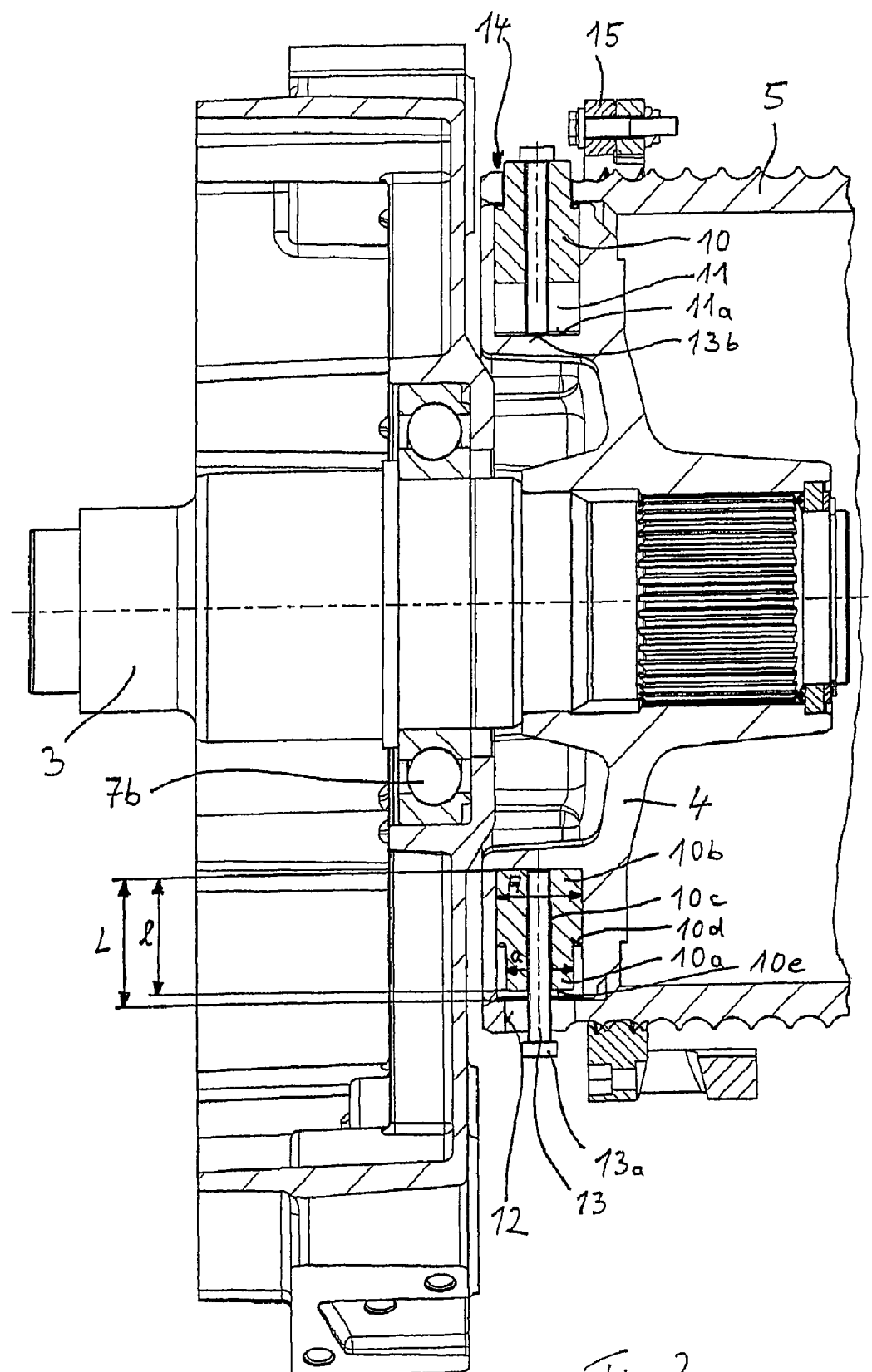
FIG. 2 is a sectional view of the coupling region of a lifting gear in accordance with the invention.

FIG. 2 illustrates a sectional view of the coupling region of a lifting gear 1 in accordance with the invention. The coupling is disposed between the drive flange 4 and the cable drum 5, whereas for its part the drive flange 4 is connected in a rotationally fixed manner to the drive shaft 3. Of course, it is also possible to dispose a coupling between the drive shaft 3 and the drive flange 4, wherein in this case it is necessary for the drive flange 4 to be connected in a rotationally fixed manner to the cable drum 5. As a third embodiment of the coupling it is possible to accomplish the transmission of torque both from the drive shaft 3 to the drive flange 4 and also from the drive flange 4 to the cable drum 5 by means of a coupling.

As illustrated in FIG. 2, the coupling includes at least one coupling element 10 which rests in a recess 11 of the drive flange 4. Two coupling elements 10 are illustrated by virtue of the selected angular section. The upper coupling element 10 is located in an attachment position and is disposed in a positive-locking manner between the drive flange 4 and the cable drum 5 which are to be coupled together. In contrast, the lower coupling element 10 is located in a rest position, in which it is located completely in the recess 11 of the drive flange 4 and thus does not couple the drive flange 4 and the cable drum 5 together.

Each coupling element 10 is sleeve-shaped and comprises at both ends driving cams 10a, 10b which face radially outwards and inwards and which engage into corresponding recesses 11 of the drive flange 4 and bores 12 of the cable drum 5 in order to transmit the torque.

Since the coupling elements 10 are subject to a considerable shear stress by virtue of the torque transmitted between the drive flange 4 and the cable drum 5, the coupling elements 10 may be made of steel.

FIG. 2 also illustrates that the coupling element 10 is formed in a sleeve-like manner and consists substantially of the outer driving cam 10a, the inner driving cam 10b and a central channel 10c which extends through the entire coupling element 10 and thus the outer driving cam 10a and the inner driving cam 10b. The outer driving cam 10a is annular and has a smaller outer diameter a than the likewise annular, inner driving cam 10b with its outer diameter A. As a consequence, the coupling element 10 acquires a stepped outer shape having an annular and planar shoulder 10d in the region of the transition from the inner driving cam 10b to the outer driving cam 10a. The central channel 10c comprises on its inner end an internal thread for the screw 13. The screw 13 is supported with its head 13a on an outer, annular bearing surface 10e of the outer driving cam 10a. In the attached state, this bearing surface 10e is located in the region of the outer surface of the cable drum 5 and protrudes only slightly. In the illustrated embodiment, the head 13a of the screw 13 does not protrude further than the thickness of the cable drum 5, in any event not further than an annular cable guide 15 disposed on the cable drum 5.

FIG. 2 illustrates the upper coupling element 10 in its operating position, in which the coupling element 10 is pushed outwards to a stop position in the recess 11. In the associated assembly position, no screw 13 is initially located in the channel 10c, which is provided with an internal thread, and the coupling element 10 rests, displaced inwardly, on the base 11a of the blind hole-like and cylindrical recess 11, whose inner diameter is slightly larger, in order to permit a displacement in the longitudinal direction of the coupling element 10 but at the same time to ensure transmission of torque. For example, a transition fit may be used in this case. The length l of the coupling element 10 is less than or equal to the length L of the recess 11, so that in the assembly position of the coupling element 10, the outer driving cam 10a does not protrude from the recess 11 and thus the outer periphery of the drive flange 4. Therefore, in the assembly position of the coupling element 10 it is possible within the scope of the assembly of the lifting gear 1 to push the cable drum 5 onto the drive flange 4. In this case, the bores 12 in the cable drum 5 are aligned with the outer driving cams 10a of the coupling elements 10, so that subsequent to the attachment of the cable drum 5 to the drive flange 4 the screw 13 can be screwed into the channel 10c, until the tip 13b of the screw 13 impinges upon the base 11a of the recess. A further turning of the screw 13 ensures that the tip 13b of the screw 13 is supported on the base 11a and the coupling element 10 moves with its outer driving cam 10a outwards from the drive flange 4 and enters the bore 12 of the cable drum 5, until at the end the shoulder 10d lies against the inner surface 5a of the cable drum 5. An attachment piece for a tool is also provided on the outer driving cam 10a, in order to secure the coupling element 10 when tightening the screw 13. The corresponding tools and attachment pieces are of the commercially available type, e.g. hexagon flat. In the operating position, the attachment piece protrudes from the cable drum 5. Therefore, the torque is transmitted directly from the drive flange 4 via the coupling element 10 to the cable drum 5. The screw 13 secures the coupling element 10 only in its operating position and does not lie in the flux of force of the torque transmission. It has been demonstrated that the operating forces keep the coupling element 10 in the operating position.

In order to be able to compensate for a longitudinal offset between the cable drum 5 and the drive flange 4, in the case of the illustrated exemplified embodiment the bores 12 for receiving the outer driving cams 10a are formed with a larger diameter from the outer periphery of the outer driving cams 10a and are thus formed in the axial and radial direction of the cable drum 5 to be larger than the corresponding driving cams 10a which are to be received. A gap 14 which is produced by reason of this formation and which is in the range of about 0.2 to 1.00 mm, for example 0.8 mm, is evident in FIG. 2.

FIG. 2 illustrates how an angular offset between the longitudinal axes of the cable drum 5 and the drive flange 4 and/or the drive shaft 3 can be compensated for. For this purpose, the drive flange 4 or the inner side of the cable drum 5 is curved.

A coupling which is formed in this manner is characterised by virtue of the fact that it is constructed in a simple manner and with a small installation size ensures that any manufacturing and assembly tolerances which occur are reliably compensated for. High torques can also be transmitted.

Figure 3:
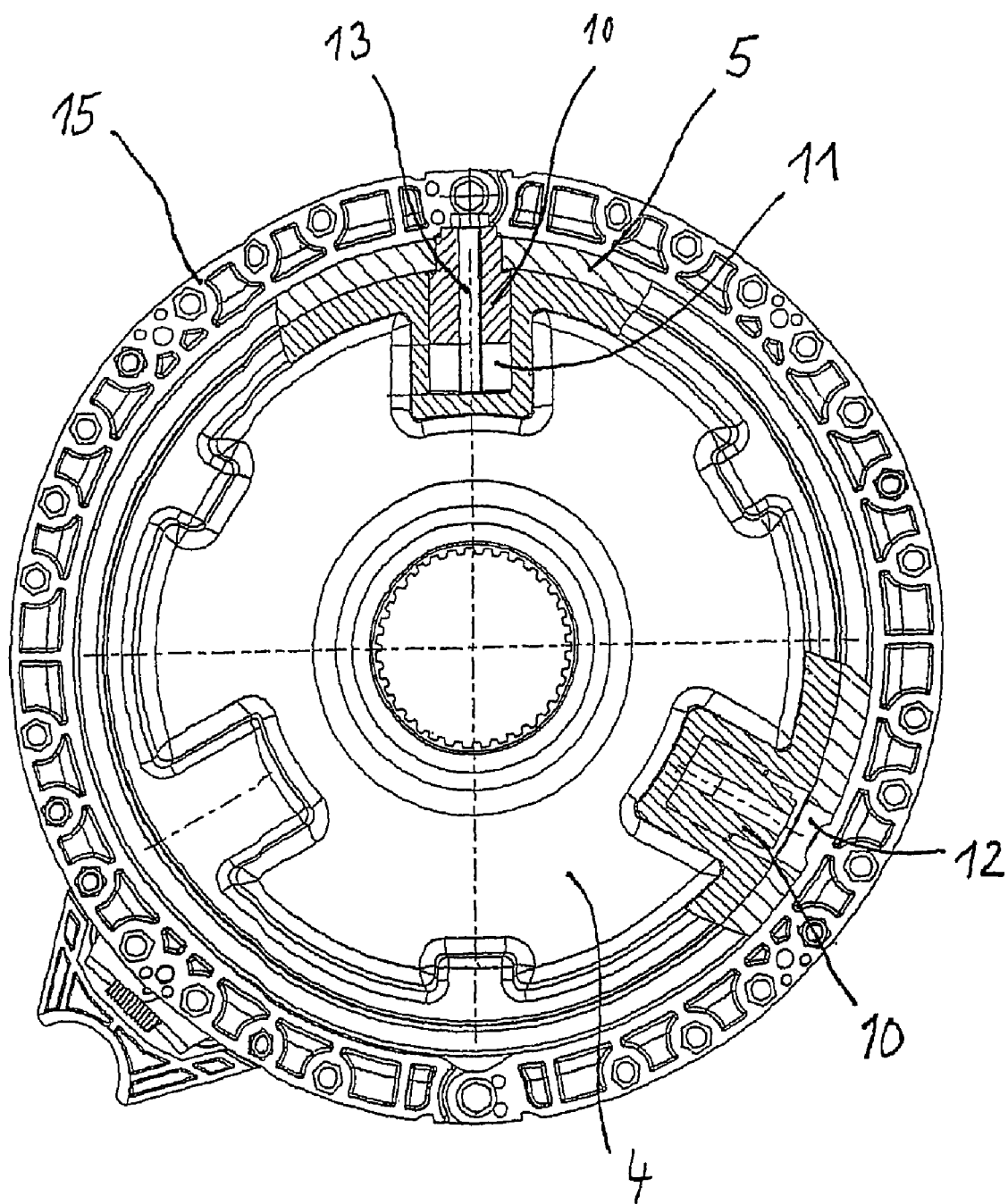
FIG. 3 is a partial-section front view of the cable drum with the drive flange.

FIG. 3 illustrates a front view partially in section of the cable drum 5 with the drive flange 5 and it is thus apparent that three bores 12, three recesses 11 and three coupling elements 10 are provided distributed uniformly on the periphery. This provides a sufficient level of stability.

The invention claimed is:

1. A lifting gear comprising:
   a drive unit;
   a drive shaft that is drivably coupled to said drive unit and has a drive flange fixed thereon;
   a cable drum adapted to be connected to said drive flange;
   a coupling adapted to connect said cable drum to said drive flange, wherein said coupling comprises at least one coupling element which engages a respective recess in said drive flange and is disposed into a bore in said cable drum in order to transmit torque; and
   wherein said at least one coupling element is displaceable and fixable radially from an assembly position to an operating position, in which said coupling element drivingly connects said drive flange and said cable drum together, said coupling element formed as a sleeve having a central and radially aligned channel and including a screw adapted to be screwed into said channel to move said coupling element from the assembly position radially outwards to the operating position, said coupling element comprising an outer driving cam and an inner driving cam that adjoins said outer driving cam, said outer driving cam having an outer diameter that is smaller than an outer diameter of said inner driving cam, and said coupling element comprising a shoulder in the region of the transition between said inner driving cam and said outer driving cam, and wherein in the operating position said shoulder lies against an inner surface of said cable drum.

2. The lifting gear as claimed in claim 1, wherein in the assembly position said coupling element is located completely in said recess.

3. The lifting gear as claimed in claim 2, wherein in the operating position said coupling element is held in said recess by said cable drum.

4. The lifting gear as claimed claim 3, wherein a plurality of said coupling elements are disposed along a periphery of said drive flange.

5. The lifting gear as claimed in claim 1, wherein in the operating position said coupling element is held in said recess by said cable drum.

6. The lifting gear as claimed in claim 1, wherein in the operating position said screw is supported with a tip of said screw on a base of said recess, which is formed in the manner of a blind hole.

7. The lifting gear as claimed in claim 6, wherein said screw comprises a head and said cable drum comprises a cable guide, and wherein in the operating position said screw head protrudes from said cable drum to a lesser degree than said cable guide.

8. The lifting gear as claimed in claim 6, wherein said screw comprises a head, and wherein in the operating position said screw head protrudes from the surface of said cable drum to a lesser degree than a wall thickness of said cable drum.

9. The lifting gear as claimed in claim 1, wherein said screw comprises a head and said cable drum comprises a cable guide, and wherein in the operating position said screw head protrudes from said cable drum to a lesser degree than said cable guide.

10. The lifting gear as claimed in claim 9, wherein in the operating position said screw head protrudes from the surface of said cable drum to a lesser degree than a wall thickness of said cable drum.

11. The lifting gear as claimed in claim 10, wherein a plurality of said coupling elements are disposed along a periphery of said drive flange.

12. The lifting gear as claimed in claim 11, wherein three of said coupling elements are disposed along said periphery of said drive flange.

13. The lifting gear as claimed in claim 1, wherein a plurality of said coupling elements are disposed along a periphery of said drive flange.

14. The lifting gear as claimed in claim 13, wherein three of said coupling elements are disposed along said periphery of said drive flange.

15. The lifting gear as claimed in claim 1, wherein said screw comprises a head, and wherein in the operating position said screw head protrudes from the surface of said cable drum to a lesser degree than a wall thickness of said cable drum.

* * * * *

UNITED STATES PATENT AND TRADEMARK OFFICE
CERTIFICATE OF CORRECTION

| | |
|---|---|
| PATENT NO. | : 7,926,789 B2 |
| APPLICATION NO. | : 12/532694 |
| DATED | : April 19, 2011 |
| INVENTOR(S) | : Kohlenberg et al. |

Page 1 of 1

It is certified that error appears in the above-identified patent and that said Letters Patent is hereby corrected as shown below:

<u>Column 6</u>
Line 1, Claim 4, insert --in-- after "claimed"

Signed and Sealed this
Thirteenth Day of March, 2012

David J. Kappos
*Director of the United States Patent and Trademark Office*